United States Patent [19]
Grieger

[11] Patent Number: 6,015,186
[45] Date of Patent: Jan. 18, 2000

[54] FOLDING BENCH SEAT

[75] Inventor: Andreas Grieger, Kressbronn, Germany

[73] Assignee: Aguti Produktenwicklung & Design GmbH, Kressbronn, Germany

[21] Appl. No.: 09/077,493

[22] PCT Filed: Nov. 27, 1996

[86] PCT No.: PCT/EP96/05239

§ 371 Date: Jul. 27, 1998

§ 102(e) Date: Jul. 27, 1998

[87] PCT Pub. No.: WO97/19830

PCT Pub. Date: Jun. 5, 1997

[30] Foreign Application Priority Data

Nov. 27, 1995 [DE] Germany ............... 195 44 014

[51] Int. Cl.[7] ...................................... B60N 2/34
[52] U.S. Cl. ................... 297/67; 297/118; 296/69; 5/37.1; 5/41
[58] Field of Search ................... 297/63, 65, 67, 297/483, 354.13, 118; 5/37.1, 39, 41; 296/650.1, 65.16, 69

[56] References Cited

U.S. PATENT DOCUMENTS

| | | | |
|---|---|---|---|
| 4,186,960 | 2/1980 | Mizelle | 297/63 |
| 4,205,405 | 6/1980 | Hagney | 5/37.1 |
| 4,608,722 | 9/1986 | Zorzetto | 5/37.1 |
| 4,869,554 | 9/1989 | Abu-Isa et al. | 297/452.56 |
| 4,939,802 | 7/1990 | Lafer | 5/41 X |
| 5,401,072 | 3/1995 | Farrand | 297/483 X |
| 5,452,941 | 9/1995 | Halse et al. | 297/483 |

*Primary Examiner*—Peter R. Brown
*Attorney, Agent, or Firm*—Knobbe, Martens, Olson & Bear, LLP

[57] ABSTRACT

A folding bench seat is provided, particularly for vehicles. It consists of a bench seat frame with a restraint system and comprises a base frame secured to the floor and a top structure. The top structure has an upright column unit, a back unit and a seat unit, and the column unit is supported via a horizontal pivot on the base frame and can be folded down from the upright position to a flat position.

21 Claims, 6 Drawing Sheets

FOLDING BENCH SEAT

FIELD OF THE INVENTION

The invention relates to a folding bench seat for vehicles, particularly for caravans, comprising a seat frame with a restraint system, which comprises a base frame and a top structure fixed to the floor, the top structure having an upright column unit, a back unit and a seat unit.

BACKGROUND OF THE INVENTION

Such folding bench seats are intended to offer an opportunity of comfortable seating for passengers, and during overnight stays or pauses is intended to be foldable into a position which forms as wide and comfortable as possible a reclining surface for at least one person. Also however these folding bench seats should take account of the increased safety requirements of modern caravans. Thus the previous two-point restraint system is increasingly being replaced by the three-point belt system, which in the case of an accident provides clearly improved protection for the occupants. The incorporation of three-point restraint systems requires the presence of a stable structure, which however is often not present in caravans. Therefore as a rule an upright column is located on the seat back, which is attached to the floor/frame area of the vehicle, and ensures sufficient stability for the attachment of upper connection points for three-point restraint systems.

The document DE-U-93 14 859 (=DE-A-43 33 420) describes such a folding bench seat with restraint system for caravans. This folding bench seat substantially consists of a frame structure, into which there is integrated a belt bearer, an upright column, upon which there is located an upper connection point for a three-point restraint system, a back unit and a seat unit. The upright column is inserted into a complementary recess in the belt bearer and secured in an upright position therein. Thus the restraint system, starting from the belt bearer, is passed through the column, in the form of a cavity profile, to the upper connection point of the upright column in an upward direction. Furthermore, the seat back and seat surface are secured in a foldable manner on the frame construction, so that the latter, in the unfolded position, together with a folding bench seat of similar structure, form a larger reclining surface.

A considerable disadvantage of this construction of folding bench seat however is that on its own it does not form a reclining surface which is sufficiently long and large to serve as a sleeping place for several persons, so that cooperation with another similar bench seat arrangement is always necessary. A further considerable disadvantage of this column arrangement resides in the fact that the belt forces occurring in an accident are absorbed by the upright column alone, which is thus subjected to intense bending stress. Therefore, under the effect of the bending moment resulting from this type of introduction of force, considerable tension peaks occur at the anchoring point of the column in the frame. This also applies to seat columns which are foldably mounted according to DE-A-44 42 813, as in this case the column, due to its length, is exposed to intense bending stresses in a crash situation. In addition, this construction requires a considerable amount of space for folding, which is however often taken up by assemblies on the rear side of the folding bench seat. This can lead to considerable restrictions in the use of the living or lying surface, or to a risk of injury on the relatively sharp-edged column.

SUMMARY OF THE INVENTION

Accordingly the object underlying the invention is to provide a folding bench seat for vehicles, particularly caravans, which in the case of an accident enables a more favourable introduction of force, which is simple to handle and in the extended position forms a sufficiently large reclining surface for at least one person.

This object is achieved by a folding bench seat with the features of patent claim 1.

Accordingly a top structure of a folding bench seat is located by means of a horizontally-aligned pivot joint in a foldable manner on a base frame, the top structure consisting of a column unit, a back unit and a seat unit, which are likewise coupled together by means of horizontally-aligned pivot joints, so that in an accident the force is introduced via a triangular arrangement (seen in side view) comprising a column frame and a back frame into the base frame and from there into the floor. In this case the back unit, acting as a diagonal strut, is preferably supported on a projection of the base frame in a positive-locking manner. This form of introduction of force makes the column unit into a diagonal tensile tie, the back unit into a diagonal strut and in this way substantially removes the conditions for the occurrence of a bending moment, so that the tension peaks at the connection point between column and frame are considerably reduced. Thus these supporting parts may be relatively thin in construction.

Furthermore, the column unit, due to its foldable arrangement on the base frame, can be brought together with the back unit and the seat unit out of its upright position with an outward folding movement rapidly and simply into a reclining position, the column unit itself becoming a component of the upholstered reclining surface and thus no longer representing a source of injury. In this reclining position, i. e. in the folded-down position of the column unit, the folding bench seat forms a reclining surface which is large enough to serve as a sleeping place for several persons, as in contrast to prior art the column unit, about 70 cm high, is added to the length of the reclining surface.

Advantageous developments are the subject matter of the sub claims, and the entire top structure can be movable laterally along the first pivot joint relative to the base frame, in order to enable an additional enlargement of the reclining surface. The column unit, the back unit and the seat unit are thus respectively constructed from an upholstered part and a framework part. The base frame can in addition be fitted with a support device, which additionally supports the folding bench seat in its reclining position.

In addition, the base frame preferably has on an upper carrier an aperture, in which the top structure is supported on a projection in an engageable and positive-locking manner. Furthermore, an upper articulation point for a three-point restraint system is located on the tension column frame of the column unit, the belts of the restraint system for example being capable of extending at or in the tension column frame which is in the form of a hollow profile. Like the tension column frame, the back unit and the seat unit can also be in the form of a hollow profile, for example a pressure-extruded aluminium profile. In this case the hollow profile can be a U-profile, a rectangular quadrilateral tube, etc.

A further advantage of the invention is its compact structure. By folding down the column portion, the necessary storage space is reduced, which is of great use particularly during transport in delivery vehicles during production or storage, as in this way the costs can be reduced.

BRIEF DESCRIPTION OF THE DRAWINGS

The invention will be described and explained in more detail in the following, with reference to the drawings, which show.

DETAILED DESCRIPTION OF THE DESCRIPTION

Figure 1:
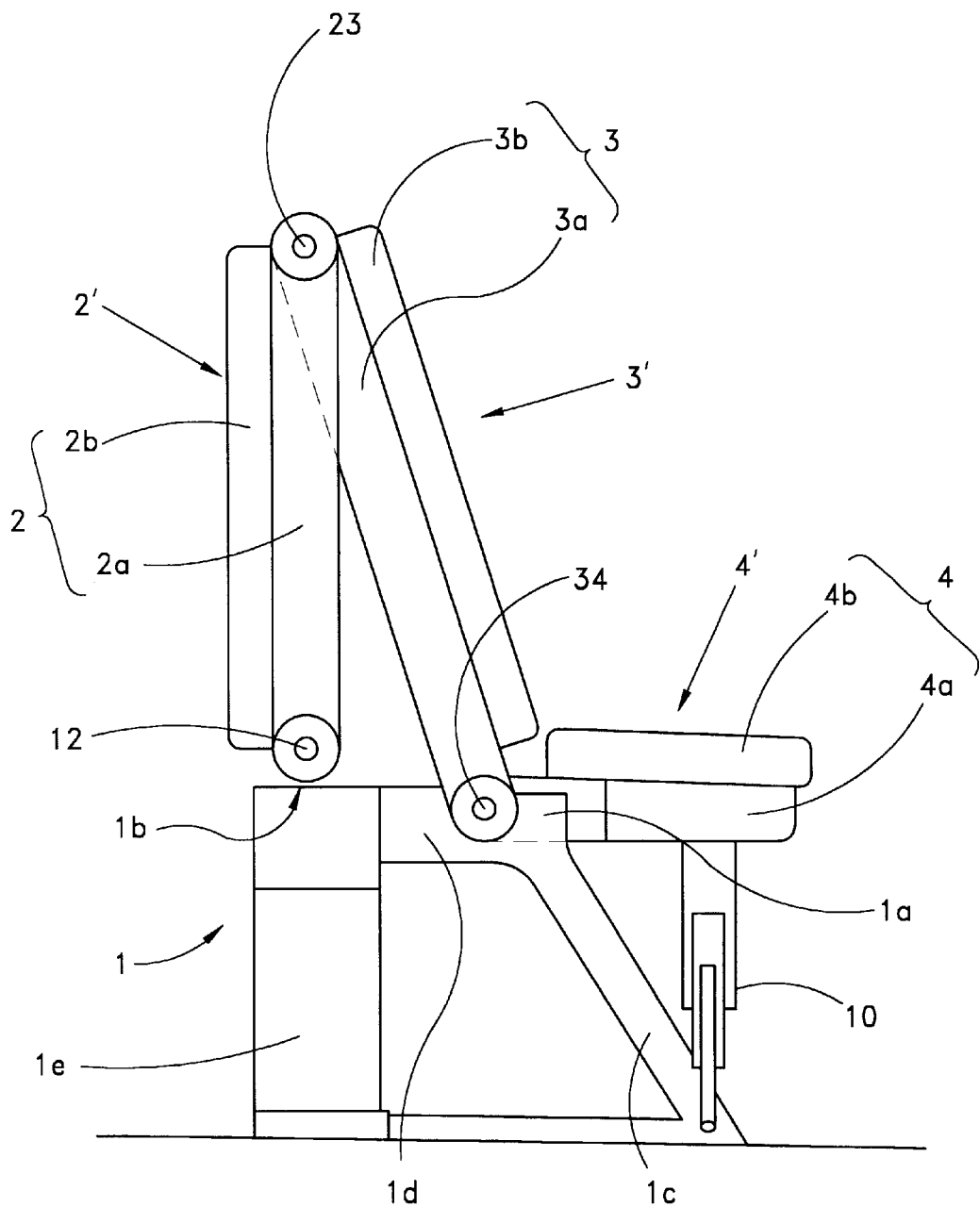
FIG. 1: a schematic side view of a folding bench seat in the sitting position.

FIG. 1 shows a schematic side view of a folding bench seat in the sitting position, comprising a base frame 1 and a top structure 2, 3, 4. The base frame 1 is attached to the floor or the chassis of the vehicle, particularly by screws or rapid fixtures. The top structure is composed of a column structure 2, which is made up of a tension column frame 2a with a fitted upholstered portion 2b, a back unit 3, made up of a back frame 3a with a fitted upholstered portion 3b, and a seat unit 4, made up of a seat frame 4a with fitted upholstered portion 4b. In the arrangement shown in FIG. 1, the column unit 2, the back unit 3 and the seat unit 4 have the respective sitting positions 2', 3' and 4'. The tension column frame 2a is located by means of a horizontally-aligned pivot joint 12 in a foldable manner on a transverse support or a bracket 1b in the upper area of the base frame 1. The seat frame 3a is correspondingly located by means of a horizontally aligned pivot joint 23 in a foldable manner on the upper terminal area of the tension column frame 2a, and the seat frame 4a is located by means of a horizontally-aligned pivot joint 34 in a foldable manner on the lower end of the back frame 3a. In order during an accident to hold the top structure 2, 3, 4 in its sitting position 2', 3', 4', there is formed on an upper carrier 1d of the base frame 1 by means of a recess, a projection 1a, upon which the seat back frame 3a is supported in an engaging and positive-locking manner. In this case the arrangement of this projection 1a is not restricted only to the engagement-groove-like embodiment shown here above a support foot 1c of the base frame 1. There may also be envisaged a transverse support, not shown here, attached to the base frame 1, which forms on its upper side in the longitudinal direction at least one projection, which engages in a positive manner in corresponding apertures between the back frame 3a and the seat frame 4a, and thus supports the lower area of the back frame 3a against slipping.

In respective extension of the configuration of the tension column frame 2a or of the back frame 3a in a downward direction, cross-struts or support feet 1e or 1o of the base frame 1 are supported on the floor area. During an accident, therefore, the force can be introduced via the tension column frame 2a acting as a diagonal tensile tie, and the back frame 3a functioning as a diagonal strut, into the support feet 1e, 1c of the base frame 1 and from there into the floor or vehicle chassis, leading to a considerable reduction in the material tensions occurring on the folding bench seat, and in particular avoidance of bending moments. In this way the stability of the folding bench seat and the safety of the occupants is considerably increased. An is particularly visible from FIG. 3, a base frame 1 has laterally at least two of the support feet 1c, 1e and projections 1a. The support foot 1e can however also be designed as a continuous supporting portion.

There is also provided on the base frame 1 a support device 10, which is articulated in a foldable manner on the lower end of the support foot 1c of the base frame 1, and in the seated position supports the seat unit 4 from below. In this case the support member 10 can be telescopic in construction, as shown in FIG. 1, or can be made up of at least two members hinged together (not shown). It could also be envisaged to arrange two support members at the support feet 1o of the base frame 1, in order, in a reclining position of the top structure 2, 3, 4, to support both the back unit 3 and also the seat unit 4. Furthermore, the arrangement of additional support members is not restricted to the lower end of the support foot 1c, but can be effected anywhere on the base frame 1, for example at the support foot 1e or centrally on the support foot 1c. In this case the support member 10 can be formed by a conventional bench seat box, in which the base frame 1 is surrounded on its outer side by a covering, and thus can serve as a trunk like storage space.

Figure 2A:
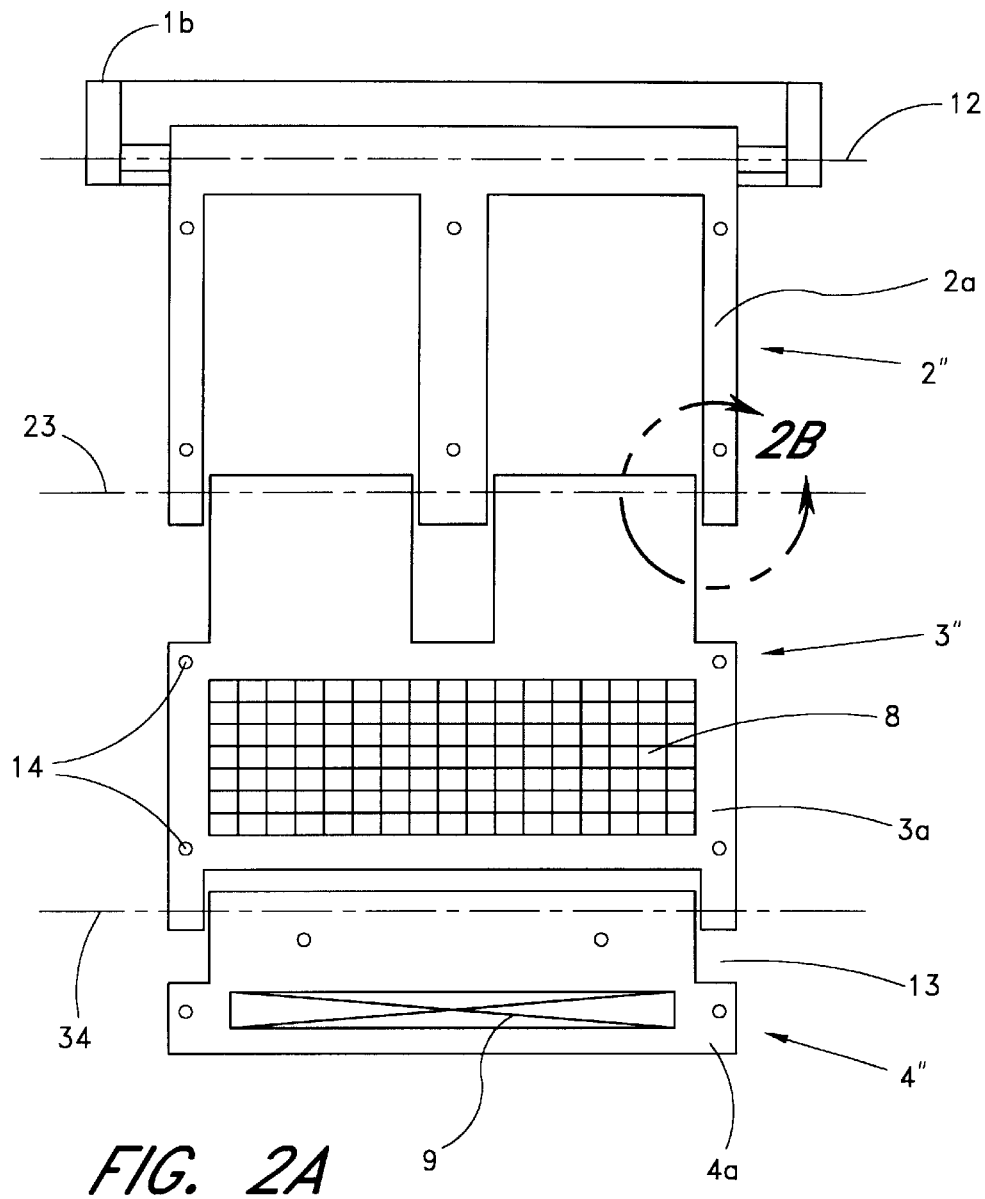
FIG. 2: a schematic plan view of an unfolded base frame unit of the folding bench seat according to FIG. 1, but without upholstery.
Figure 2B:
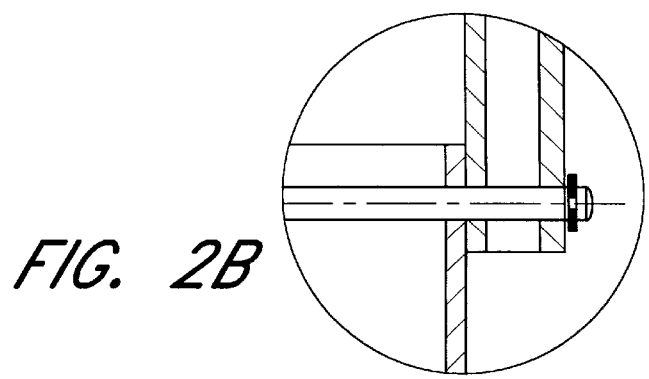

FIG. 2 shows a schematic plan view of the frame portions 2a, 3a, 4a of the top structure of the folding bench seat in the reclining position 2", 3", 4". The tension column frame 2a is in this case X-shaped and preferably consists of a welded aluminium cavity profile. One end of the tension column frame 2a is mounted by means of the horizontally-aligned pivot joint 12 in the bracket 1b (here indicated only diagrammatically) of the base frame 1, while the other end, the upper end in the seated position, of the tension column frame 2a is coupled by means of the horizontally-aligned pivot joint 23 to one end of the back frame 3a, so that sufficient free space remains for pivoting between the tension column frame 2a and the back frame 3a. This ensures that, out of the reclining position (see FIG. 4), after pivoting the tension column frame 2a and the back frame 3a about the pivotal axis of their pivot joints 12 and 23, the upright seated position 2', 3' is maintained. The seat frame 4a is mounted in the same way in the back frame 3a as the back frame 3a is mounted in the tension column frame 2a, i.e. by means of a pivot joint 34. The pivot joint connections 12, 23 and 34 can in this case be constructed as previously-known hinge bolt connections, in which an axle bolt connects the two components together in an articulated manner. This can be seen from the detail at the foot of FIG. 2; the axle bolt can be secured for example by securing rings or can have further engagement elements for blocking the respective pivot joints. The articulated connection of the components can however also be formed by any other type of pivotal coupling of two components.

In the view in FIG. 2, there are further provided at the left-hand and right-hand outer sides, apertures 13 between the back frame 3a and the seat frame 4a, in which the projections 1a of the base frame 1 engage in order to support the back frame 3a, when the latter is brought into the seated position 3' according to FIG. 1. The back frame 3a and the seat frame 4a are formed for example from an aluminium cavity profile and for reasons of economy of materials or weight, can include openings, which are covered by a net-like cover 8 or by diagonal struts 9, in order to obtain additional support for the upholstery portions 3b, 4b. For the same reasons, it is possible to cover the free spaces between the legs of the M-shaped tension column frame 2a, this however not being shown here. Naturally, other covering or upholstery forms well known to the person skilled in the art can be used.

The upholstered portions 2b, 3b and 4b can be connected in a push-in manner to the associated frames 2a, 3a and 4a or may engage therein, for which purpose the frames 2a, 3a, 4a have receiving holes 14 for complementary push-in connection on the underside of the upholstery. Naturally, the upholstery portions 2b, 3b, 4b may be secured in another way to the frames 2a, 3a, 4a, thus for example by means of Velcro-type closures, or they may also be integrally foamed onto the frame parts. An advantage of a push-in connection is however that the upholstery portion in blocked and yet can be removed for cleaning or renewal. It may also be envisaged that these upholstery portions 2b, 3b, 4b may be secured to the frame parts 2a, 3a, 4a by means of lateral support rails, so that the upholstery is simply laid on.

Figure 3:
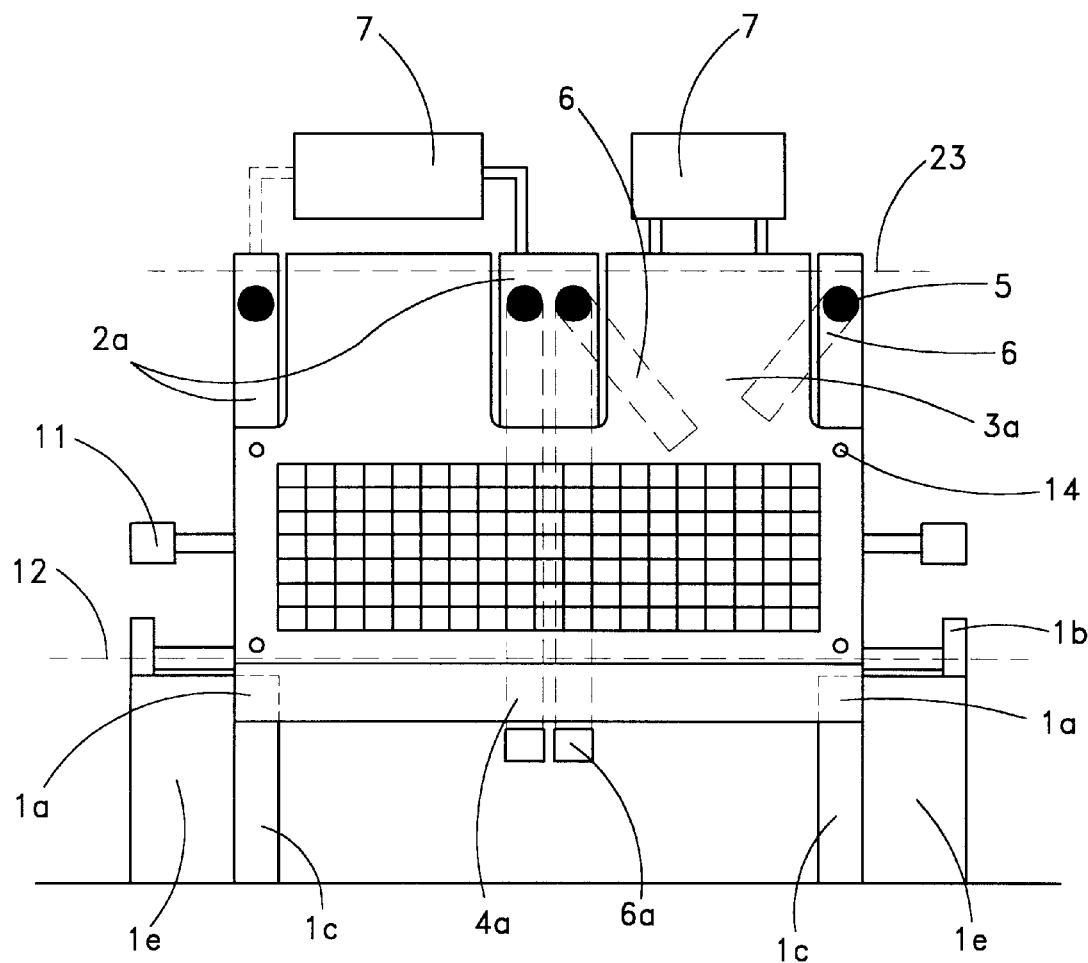
FIG. 3: a schematic front view of a folding bench seat according to FIG. 2 in the sitting position.

FIG. 3 shows a schematic front view of a frame structure 2a, 3a, 4a of a folding bench seat in the seated position 2', 3', 4'. Their upper connection points 5 for the shoulder belts are preferably attached to the tension column frame 2a. The upper hinge or connection points 5 can be attached either to the central portion or the external portions of the tension column frame 2a. If the upper connection points 5 of the restraint system 6 are located on the central portion of the tension column frame 2a, then the belt runs outwards to lower connection points or belt locks (not shown) on the base frame 1. If the upper connection points 5 of the restraint system 6 are located on the external parts of the tension column frame 2a, the belt 6' respectively runs internally to lower central connection points (not shown) on the base frame 1, as can be seen from the view in dotted lines of the belt configurations in FIG. 3. Due to the stable construction of the back frame 3a as a diagonal strut, an upper connection of the three-point restraint system 6 to the lower end of the back frame 3a is possible, this not however being shown for reasons of clarity. The belt or restraint system 6 is preferably passed at or in the column unit 2 and comprises belt rollers 6a, which are preferably located at the rear portion of the base frame 1 on its transverse support or bracket 1b.

FIG. 3 also shows head restraints 7, 7', which can be located either on the column frame 2a or on the back frame 3a. In the present view in this case the head restraint 7 is insertable by means of a plug-in unit projecting for example in a tubular fashion, into the tension column frame 2a. The head restraint 7' is another embodiment, which in a similar way can be pushed into the back frame 3a. Naturally the head restraints may also be attached in another way well known to the person skilled in the art to the tension column frame 2a or the back frame 3a. Furthermore, schematically indicated on the side surfaces of the back frame 3a are arm rests 11, which can be so disposed that they serve laterally to support the upholstered portion 3b.

Figure 4:
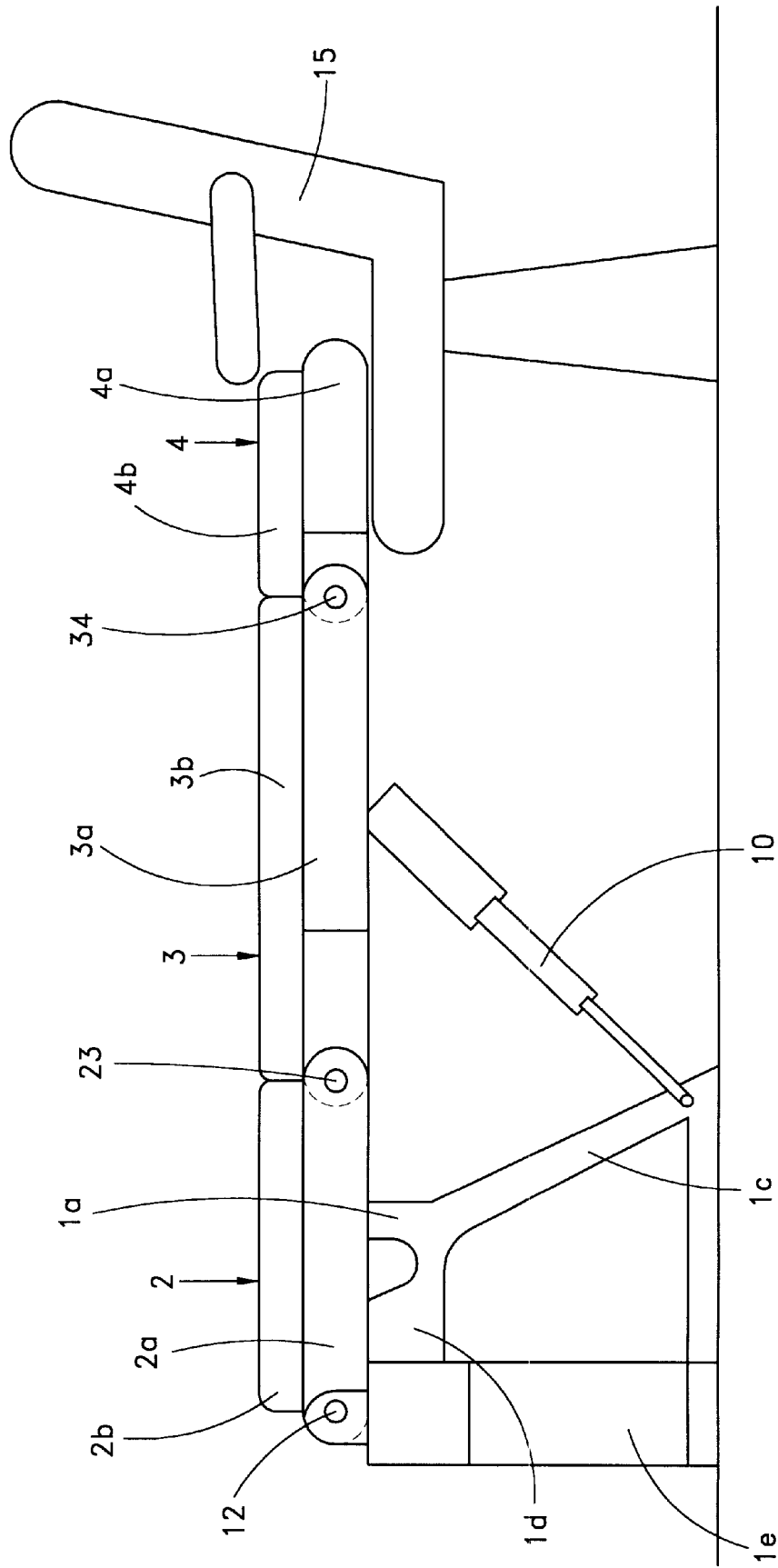
FIG. 4: schematic side view of a folding bench seat in the reclining position.

FIG. 4 shows a schematic side view of the folding bench seat in the reclining position 2", 3", 4". Thus for example a swivel seat 15 can serve as a forward support for the seat unit 4, and the back unit 3 can be supported by the support device 10. Thus in an advantageous way, the pivot joint 12 is mounted in the bracket 1b of the base frame 1 in such a way that the column unit 2, after pivoting about the pivoting axis of the pivot joint 12, lies on the carrier 1d of the base frame 1. As already indicated, by means of attachment of a further support device in the form of a bench seat box, the entire structure can be supported in such a way that it also supports the back unit 3, and the seat unit 4 is locked by blocking the pivoting axis 34 in a non-rotatable manner, so that the seat 15 need no longer be used as a support member.

Figure 5A:
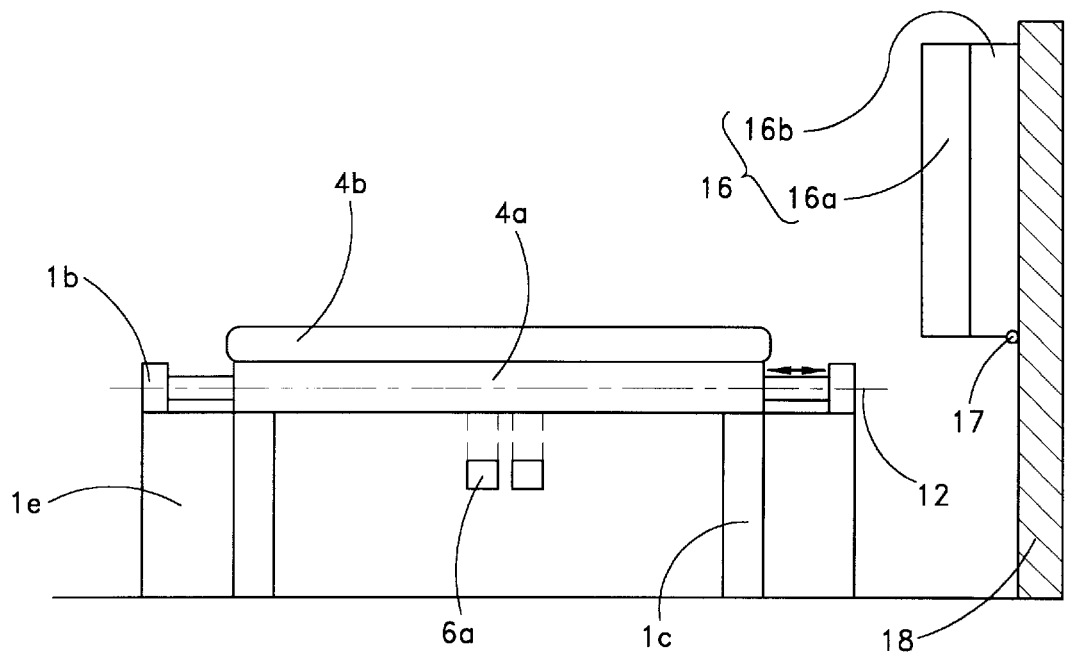
FIGS. 5a,5b: schematic front views of a folding bench seat, displaceable along a pivot joint, in the reclining position.
Figure 5B:
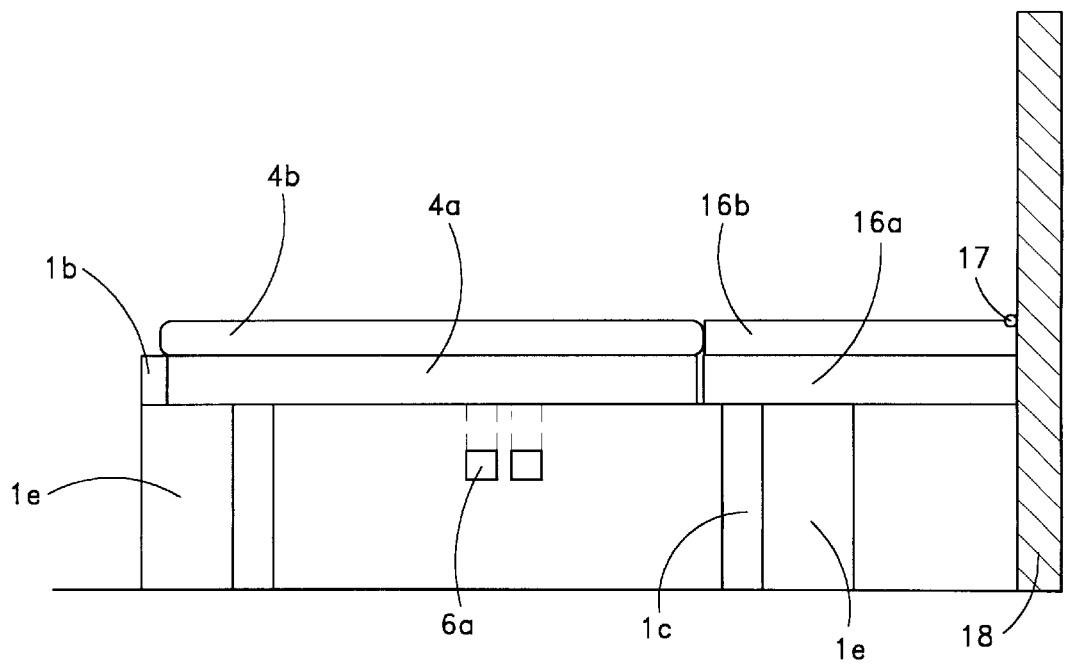

FIG. 5a shows a schematic front view of a folding bench seat according to FIG. 4 in the reclining position 2", 3", 4" with a top structure 2, 3, 4 which is displaceable along the axis of the pivot joint 12 relative to the base frame 1 (see the two arrows in FIG. 5a). FIG. 5a also shows a further seat unit 16, which may be folded down and is located on the side wall 18 of the caravan, and which is made up of a frame 16a and an upholstered portion 16b. The seat unit 16 can be articulated for example by means of a hinge joint 17 to the side wall of the caravan 18 in a previously known way. If now the top structure 2, 3, 4 is displaced along the pivot joint 12 relative to the base frame 1 out of its outset position shown in FIG. 5a to the left, i. e. as far as the left stop means on the bracket 1b, and then the seat unit 16 is folded down, so that it lies on the base frame 1, as shown in FIG. 5b, an enlarged reclining surface is obtained. Naturally, the seat unit 16 may also be supported by an additional support device, or may cooperate in another embodiment with the reclining surface of the top structure 2, 3, 4, for example may be connected in a push-in manner to the top structure 2, 3, 4. It should be noted that for thin lateral displacement the base frame may also be of identical width or narrower than the top frame 2, 3 and 4.

Figure 6A:
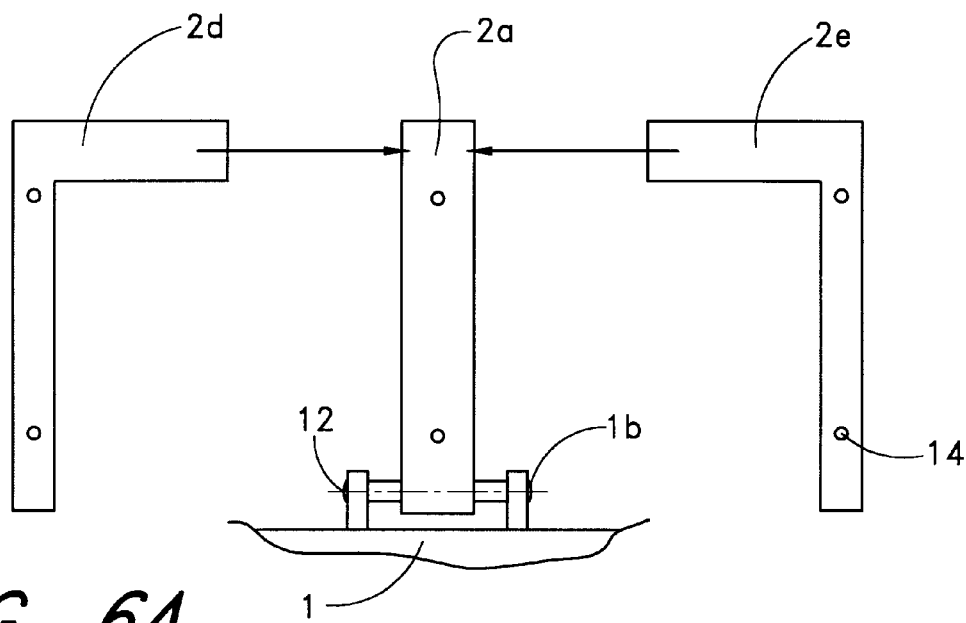
FIGS. 6a,6b: altered embodiments of a foldable column frame.
Figure 6B:
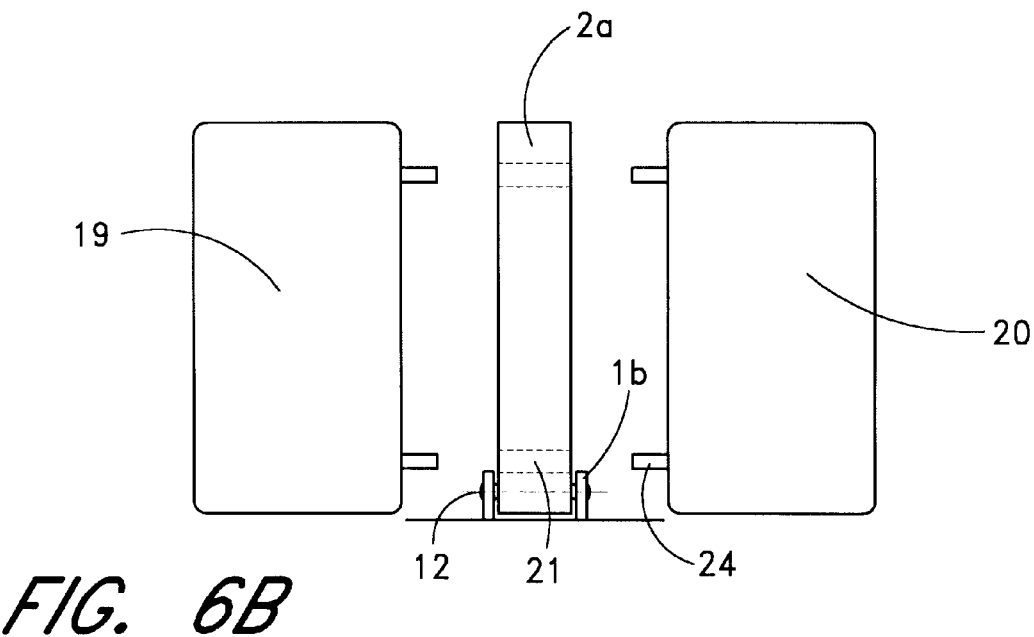

FIG. 6 shows a modified embodiment of the tension column frame 2a which, in contrast to the previous one-part embodiment, is of a multiple-part construction. Thus the tension column frame May be substantially made up of a central column portion 2a, a left-hand column portion 2d and a right-hand column portion 2e, these individual parts, depending on the width of bench seat required, may be combined together in any way or may be detachably connected together. Here for example a construction as a plug-in connection or a screwed connection may be envisaged. These extension parts 2d, 2e can in this case be of a relatively lightweight construction, as it is sufficient for the stability of the structure and for the introduction of force in the case of a crash, if the column structure, triangular in side view (FIG. 1) is built up merely from the narrow-built central traction column portion 2a and the back frame 3a. Thus the arrangement of upholstered portions 19 or 20 may be provided on the right-hand and left-hand sides of the central column portion 2a. The upholstered portions 19, 20 may be attached to the central column portion 2a by means of a plug-in connection, in which engageable projections 24 engage in complementary apertures 21 in the central column portion 2a. The upholstered portions 19, 20 corresponding to the upholstered portion 2b are in this case not load-bearing parts, (or bearing only small loads) in the case of a crash, but only in the reclining position according to FIG. 4. In this construction with a relatively slim column portion 2a, the bracket 1b for forming the pivotal axis 12 can likewise be relatively slim, as can be seen from FIGS. 6a and 6b.

I claim:

1. A folding bench seat for vehicles comprising a seat frame having a base frame configured to be attached to a floor area of a vehicle, and a top structure secured to the base frame, the top structure comprising:

an upright column unit mounted by a lower, horizontally aligned pivot joint to the base frame, and being foldable between an upright position and a reclining, generally horizontal position;

a back unit mounted by an upper, horizontally aligned pivot joint to the column unit so that the back unit extends from the upper, horizontally aligned pivot joint to form a triangular structure with the column unit and the base frame when the column unit is in the upright position;

a seat unit connected to the back unit, with the back unit being releasably connected to the base frame; and a three-point restraint system attached to the column unit at an upper turning point.

2. The folding bench seat of claim 1, wherein the restraint system includes a belt that extends along the column unit.

3. The folding bench seat of claim 1, further comprising at least one head restraint disposed on the column unit, the head restraint mounted to permit folding into the reclining position.

4. The folding bench seat of claim 1, further comprising at least one head restraint disposed on the back unit, the head restraint mounted to permit folding into the reclining position.

5. The folding bench seat of claim 1, further comprising a horizontally-aligned seat pivot joint that connects the back unit and the seat unit, the seat pivot joint being located at edges of the back unit and the seat unit.

6. The folding bench seat of claim 1, wherein the column unit comprises a column frame and an upholstered portion located within the column frame.

7. The folding bench seat of claim 6, wherein the column frame is of a one-piece design.

8. The folding bench seat of claim 6, wherein the column frame comprises a vertical central strut and vertical lateral struts detachably connected and adjustable to different bench widths.

9. The folding bench of claim 6, wherein the upholstered portion is releasable connected to the column frame.

10. The folding bench of claim 1, wherein the back unit comprises a back frame and an upholstered portion.

11. The folding bench of claim 1, wherein the seat unit comprises a seat unit frame and an upholstered portion.

12. The folding bench of claim 1, wherein the back unit comprises a back frame, the seat unit comprises a seat unit frame, and the column unit comprises a column frame, and wherein the back frame, the seat unit frame and the column frame include hollow profiles.

13. The folding bench of claim 1, wherein the back unit comprises a back frame having at least one opening filled out with a net like cover.

14. The folding bench of claim 1, wherein the back unit comprises a back frame having at least one opening filled out with at least one diagonal strut.

15. The folding bench of claim 1, wherein the seat unit comprises a seat unit frame having at least on e opening filled out with a net like cover.

16. The folding bench of claim 1, wherein the seat unit comprises a seat unit frame having at least one opening filled out with at least one diagonal strut.

17. The folding bench of claim 1, wherein the base frame includes a recess facing the top structure, and wherein the back unit engages with the recess while in the upright position.

18. The folding bench of claim 1, wherein the base frame comprises at lateral sides supports that receive the lower, horizontally aligned pivot joint, the top structure being displaceable along the pivot joint relative to the base frame.

19. The folding bench of claim 1, further comprising a support device connected to the base frame in proximity of the floor area and extending between the base frame and the top structure, the support device supporting the top structure in its reclining position.

20. A method of providing a folding bench seat in a vehicle, comprising the steps of:

attaching a base frame of the bench seat to a floor area of a vehicle;

mounting a column unit to the base frame through a lower, horizontally aligned pivot joint that extends along a lower edge of the column unit;

connecting a back unit and the column unit through an upper, horizontally aligned pivot joint that extends along an upper edge of the column unit so that the back unit extends from the upper, horizontally aligned pivot joint forming a triangular structure with the column unit and the base frame when the column unit is in an upright position;

pivotally connecting a seat unit to the back unit; and releasable connecting the back unit to the base frame in the upright position to provide a strut support for the back unit, so that the column unit and the back unit are foldable between the upright position and a reclining, generally horizontal position.

21. The method of claim 20, further comprising the step of locating an upper articulation point on the column unit for a restraint system.

* * * * *

UNITED STATES PATENT AND TRADEMARK OFFICE
CERTIFICATE OF CORRECTION

PATENT NO.    : 6,015,186
DATED         : January 18, 2000
INVENTOR(S)   : Andreas Grieger It is certified that error appears in the above-identified patent and that said Letters Patent is hereby corrected as shown below:

Column 7,
Line 42, please change "least on e" to -- least one --.

Signed and Sealed this

Third day of September, 2002

Attest:

JAMES E. ROGAN
Attesting Officer
Director of the United States Patent and Trademark Office